US008856736B2

(12) United States Patent
Khare et al.

(10) Patent No.: US 8,856,736 B2
(45) Date of Patent: Oct. 7, 2014

(54) WEB SERVICE PROXY INTERFACE AUGMENTATION

(75) Inventors: Nikhil Khare, Redmond, WA (US); William David Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 13/104,084

(22) Filed: May 10, 2011

(65) Prior Publication Data

US 2012/0291009 A1 Nov. 15, 2012

(51) Int. Cl.
*G06F 9/44* (2006.01)

(52) U.S. Cl.
CPC .................................. *G06F 8/38* (2013.01)
USPC ........... 717/109; 717/110; 717/113; 717/118; 717/121

(58) Field of Classification Search
None
See application file for complete search history.

(56) References Cited

U.S. PATENT DOCUMENTS

| | | | |
|---|---|---|---|
| 7,000,230 B1 | 2/2006 | Murray et al. | |
| 7,496,637 B2* | 2/2009 | Han et al. | 709/217 |
| 7,783,717 B1* | 8/2010 | Savchenko et al. | 709/217 |
| 2005/0076327 A1* | 4/2005 | Helal et al. | 717/100 |
| 2006/0195794 A1* | 8/2006 | Sun et al. | 715/762 |
| 2006/0230164 A1* | 10/2006 | Schlimmer et al. | 709/230 |
| 2007/0073769 A1* | 3/2007 | Baikov et al. | 707/104.1 |
| 2008/0228796 A1* | 9/2008 | Angelov | 707/101 |
| 2009/0265368 A1* | 10/2009 | Crider et al. | 707/102 |
| 2009/0292797 A1* | 11/2009 | Cromp et al. | 709/223 |
| 2010/0185954 A1 | 7/2010 | Simernitski et al. | |
| 2010/0332582 A1* | 12/2010 | Chen et al. | 709/202 |
| 2010/0333104 A1* | 12/2010 | Unnikrishnan et al. | 718/105 |
| 2012/0047130 A1* | 2/2012 | Perez et al. | 707/723 |
| 2012/0143938 A1* | 6/2012 | du Preez et al. | 709/201 |

OTHER PUBLICATIONS

"Structure of a WSDL Contract", Oct. 21, 2009.*
Erl et al., "Anatomy of a Web Service Contract", an online excerpt from Chapter 4 of "Web Service Contract Design & Versioning for SOA", Prentice Hall 2009.*
Dasari , Sri Phani Kiran., "Visual Studio 2005 extensions for SharePoint", Retrieved at <<http://microsoftdev.blogspot.com/2008/05/visual-studio-2005-extensions-for.html>>, May 14, 2008, pp. 4.
"Visual Studio 2010 Tools for SharePoint Development", Retrieved at <<http://msdn.microsoft.com/en-us/magazine/ee309510.aspx>>, Retrieved Date: Jan. 27, 2011, pp. 8.

(Continued)

*Primary Examiner* — Isaac Tecklu
(74) *Attorney, Agent, or Firm* — Kevin Sullivan; Kate Drakos; Micky Minhas (57) ABSTRACT

In a web application platform context, web service proxy interface augmentation is provided without undue loss of customization capabilities. After obtaining an address of a web service endpoint, sending a metadata query to the endpoint, and extracting operational information from the response, a contract is generated in the form of an interface. The interface does not rely on non-contract programming constructs. A file containing the interface is added to a project in an integrated development environment (IDE). From a developer perspective, the IDE displays service application(s) of a server farm identified by the developer. The developer selects a service application and receives a list of web service endpoint(s). After choosing an endpoint, the developer receives an automatically generated interface containing operational information for an operation exposed by the web service endpoint. The developer also creates in the IDE a web proxy project item that includes the interface.

20 Claims, 2 Drawing Sheets

(56) References Cited

OTHER PUBLICATIONS

Liebrand, Paul., "Visual Studio Extensions For WSS 3.0", Retrieved at <<http://www.sharepointdevwiki.com/display/public/Visual+Studio+Extensions+For+WSS+3.0>>, Oct. 10, 2009, pp. 2.
"Visual Studio 2008 extensions for Windows SharePoint Services 3.0—Problem", Retrieved at <<http://spexpert.blogspot.com/2009/04/visual-studio-2008-extensions-for.html>>, Apr. 1, 2009, pp. 3.
"Visual Studio 2008 extensions for Windows SharePoint Services (VSEWSS) v1.3 Released", Retrieved at <<http://blogs.msdn.com/b/pandrew/archive/2010/12/20/visual-studio-2008-extensions-for-windows-sharepoint-services-vsewss-v1-3-released.aspx?wa=wsignin1.0>>, Dec. 20, 2010, p. 1.
"Extending SharePoint Packaging and Deployment", Retrieved at <<http://msdn.microsoft.com/en-us/library/ee471434.aspx>>, Retrieved Date Jan. 27, 2011, pp. 3.
"Microsoft SharePoint", Retrieved at <<http://en.wikipedia.org/wiki/Microsoft_SharePoint>>, Jan. 27, 2011, pp. 3.
"Microsoft SharePoint 2010", Retrieved at <<http://en.wikipedia.org/wiki/Microsoft_SharePoint_2010>>, Jan. 19, 2011, pp. 3.
"Microsoft SharePoint Server", Retrieved at <<http://en.wikipedia.org/wiki/Microsoft_SharePoint_Server>>, Jan. 27, 2011, pp. 8.
"Providing Packaging and Deployment Information in Project Items", Retrieved at <<http://msdn.microsoft.com/en-us/library/ee696751.aspx>>, Retrieved Date Jan. 27, 2011, pp. 4.
"Walkthrough: Creating a Custom Deployment Step for SharePoint Projects", Retrieved at <<http://msdn.microsoft.com/en-us/library/ee256698.aspx>>, Retrieved Date Jan. 27, 2011, pp. 4.
"Box.net | Simple Online Collaboration: Online File Storage, FTP Replacement, Team Workspaces ~ Free Version", Retrieved at <<http://www.box.net/solutions>>, Retrieved Date Apr. 28, 2011, pp. 2.
David Taylor, "DTaylor's Blog—Site Home—MSDN Blogs", Retrieved at <<http://blogs.msdn.com/b/dtaylor/>>, Nov. 15, 2009-Feb. 23, 2011, pp. 3.
"How to: Host a WCF Service in a Managed Windows Service", Retrieved at <<http://msdn.microsoft.com/en-us/library/ms733069.aspx>>, Retrieved Date Apr. 17, 2011, pp. 11.
"RSCT Administration Guide—What are Topology Services?", Retrieved at <<http://publib.boulder.ibm.com/infocenter/clresctr/vxrx/index.jsp?topic=%2Fcom.ibm.cluster.rsct.doc%2Frsct_aix5l53%2Fbl5adm1114.html>>, Retrieved Date Apr. 26, 2011, pp. 1.
"Leveraging the SharePoint Platform (Part 1) | SharePoint Magazine", Retrieved at <<http://sharepointmagazine.net/articles/leveraging-the-sharepoint-platform-part-1>>, Aug. 14, 2008, pp. 8.
"Microsoft Sharepoint Portal Server Alternative", Retrieved at <<http://www.hyperoffice.com/microsoft-sharepoint-alternative/>>, Retrieved Date Apr. 28, 2011, pp. 3.
Tony Tai, "Migrate Google Apps Content to SharePoint—Why Microsoft—Site Home—TechNet Blogs", Retrieved at <<http://blogs.technet.com/b/whymicrosoft/archive/2011/03/07/migrate-google-apps-content-to-sharepoint.aspx>>, Mar. 7, 2011, pp. 2.
"Mocking (or faking, or maybe stubbing) a WSDL.exe SOAP service proxy", Retrieved at <<http://www.flowerchild.org.uk/archive/2010/09/22/mocking-or-faking-or-maybe-stubbing-a-wsdl-exe-soap.aspx>>, Sep. 22, 2010, pp. 3.
"Multiple Endpoints at a Single ListenUri", Retrieved at <<http://msdn.microsoft.com/en-us/library/aa395210.aspx>>, Retrieved Date Apr. 26, 2011, pp. 3.
Alpesh Nakar, "PowerShell To List Service Applications", Retrieved at <<http://www.alpesh.nakars.com/blog/powershell-to-list-service-applications/>>, Jan. 19, 2010, pp. 3.
"Publishing Metadata", Retrieved at <<http://msdn.microsoft.com/en-us/library/aa751951.aspx>>, Retrieved Date Apr. 26, 2011, pp. 2.
Christian Weyer & Buddhike de Silva, "Schema-based Development with Windows Communication Foundation", Retrieved at <<http://msdn.microsoft.com/en-us/magazine/ee335699.aspx>>, Oct. 2009, pp. 11.
"Service discovery", Retrieved at <<http://en.wikipedia.org/wiki/Service_discovery>>, Apr. 25, 2010, pp. 2.
"ServiceModel Metadata Utility Tool (Svcutil.exe)", Retrieved at <<http://msdn.microsoft.com/en-us/library/aa347733.aspx>>, Retrieved Date Apr. 27, 2011, pp. 14.
"SharePoint Alternative—Comparison of Popular SharePoint Alternatives | Microsoft SharePoint Alternative: Compare SharePoint Alternatives", Retrieved at <<http://www.sharepointalternative.com/comparison>>, Retrieved Date Apr. 28, 2011, pp. 4.
Perttu Tolvanen, "SharePoint and Atlassian Confluence, side-by-side scenarios", Retrieved at <<http://www.sharepointblues.com/2010/09/16/sharepoint-and-atlassian-confluence-side-by-side-scenarios/>>, Sep. 16, 2010, pp. 7.
David Taylor, "SharePoint Service Application Topologies—DTaylor's Blog—Site Home—MSDN Blogs", Retrieved at <<http://blogs.msdn.com/b/dtaylor/archive/2009/11/18/service-application-topologies.aspx>>, Nov. 18, 2009, pp. 4.
"SOAP", Retrieved at <<http://en.wikipedia.org/wiki/SOAP>>, Apr. 19, 2011, pp. 5.
"Strong-Named Assemblies", Retrieved at <<http://msdn.microsoft.com/en-us/library/wd40t7ad.aspx>>, Retrieved Date Apr. 8, 2011, pp. 2.
"Services in SharePoint 2010 Products", Retrieved at <<http://go.microsoft.com/fwlink/?LinkID=167092>>, Copyright Date 2010, pp. 1.
"Technical diagrams (SharePoint Server 2010)", Retrieved at <<http://technet.microsoft.com/en-us/library/cc263199(printer).aspx>>, Aug. 27, 2010, pp. 15.
"Topologies for SharePoint Server 2010", Retrieved at <<http://go.microsoft.com/fwlink/?LinkID=167089>>, Copyright Date 2010, pp. 1.
"WCF Data Service Client Utility (DataSvcUtil.exe)", Retrieved at <<http://msdn.microsoft.com/en-us/library/ee383989.aspx>>, Retrieved Date Apr. 29, 2011, pp. 3.
"Web Services Description Language", Retrieved at <<http://en.wikipedia.org/wiki/Web_Services_Description_Language>>, Apr. 13, 2011, pp. 5.
"Web Services Description Language Tool (Wsdl.exe)", Retrieved at <<http://msdn.microsoft.com/en-us/library/7h3ystb6.aspx>>, Retrieved Date Apr. 25, 2011, pp. 7.
Sahil Malik, "What is WCF?", Retrieved at <<http://blah.winsmarts.com/2008-4-What_is_WCF.aspx>>, Apr. 12, 2008, pp. 8.
"What Is Windows Communication Foundation", Retrieved at <<http://msdn.microsoft.com/en-us/library/ms731082.aspx>>, Retrieved Date Apr. 27, 2011, pp. 5.

* cited by examiner

WEB SERVICE PROXY INTERFACE AUGMENTATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A variety of web application platforms are available, with various characteristics. Some platforms are highly scalable, and some provide a central facility for multiple web applications. Some support cloud computing, and some support multiple organizations on a given server farm. Some platforms are used for purposes such as managing and provisioning intranet portals, extranets, other web sites, document management, file management, collaboration, social networking, enterprise search, business intelligence tools, process-information integration, and/or database access, for example. A variety of protocols may be used with a web platform, such as XML, Simple Object Access Protocol (SOAP), and various internet protocols such as HTTP, Remote Procedure Call (RPC), and others. A variety of commercial frameworks, development environments, libraries, and other software tools are also utilized in web application platforms.

SUMMARY

Developing, debugging, and deploying a web service in a web application platform can be challenging. In particular, it may be difficult to determine which aspects of such activities are well-suited to automation, with its attendant inflexibility, as opposed to customization, with its attendant demands on developer attention. Some embodiments described herein provide focused automation for web service proxy interface augmentation, without undue loss of customization capabilities.

From an automation tool perspective, some embodiments configure a web service proxy in a messaging environment, by automatically obtaining an address of a web service endpoint, sending a metadata query to the web service endpoint at the address, extracting operational information by parsing the query response, and generating a textual interface from the extracted operational information. In some, the textual interface is free of non-contract programming constructs. In some, a uniform resource identifier serves as the address of the web service endpoint in a simple object access protocol messaging environment. In some, the query response is in a web service description language format, such as WSDL version 2.0 or later. In some, the operational information for an operation exposed by the web service endpoint includes an operation name, parameter name(s) and corresponding parameter type(s), and an operation return type; in some, the exposed operation has no parameters. The textual interface may be generated in a C-family programming language, a BASIC-family language, or a language managed within a Common Language Infrastructure implementation, for example. Some embodiments automatically add a file containing the generated textual interface to a project in an integrated development environment.

From a developer perspective, such as that of a developer using an integrated development environment (IDE), some embodiments involve the developer identifying a server farm to the IDE, e.g., by identifying a topology service of the server farm. The developer receives from the IDE a display of service application(s) of the server farm, and enters a service application selection in the IDE. The developer then receives from the IDE a display of web service endpoint(s) of the selected service application. After making a web service endpoint choice in the IDE, the developer receives access through the IDE to an automatically generated textual interface. The interface contains operational information for an operation exposed by the web service endpoint, and is non-reliant on non-contract declarative programming constructs. With some embodiments, the developer also creates a web proxy project item in the IDE; web service endpoint(s) of the selected service application are viewed, as part of the web proxy project item. With some embodiments, the developer specifies a programming language for the automatically generated textual interface. In some cases, the developer also edits the automatically generated textual interface.

From an architectural perspective, some embodiments include a web service contract generator residing in a memory. The contract generator has a web service description language parser and a default interface. The default interface is free of non-contract declarative programming constructs. A server farm development project having a web service proxy item also resides in the memory. Some embodiments include logic (software and/or hardware suitably tailored) for determining whether a deployed web service identifier has been supplied for the web service proxy item. The logic invokes the web service contract generator if the deployed web service identifier has been supplied, and adds the default interface to the web service proxy item if the deployed web service identifier has not been supplied. Some embodiments include a contract in the form of a textual interface generated by the web service contract generator in a C-family language, a BASIC-family language, or another programming language, such as a language managed within a Common Language Infrastructure implementation.

Some embodiments include logic for obtaining an address of a web service endpoint, sending a metadata query to the web service endpoint at the address, receiving a response to the metadata query, extracting operational information by parsing the response with the web service description language parser, and generating a web service contract from the extracted operational information. Some include an address of a web service endpoint, a metadata query to the web service endpoint, a response to the metadata query, and a web service contract consistent with the response. Some include a web service proxy project item wizard. Some include operational information associated with the web service proxy item, such as an operation name and return type for an operation exposed by a web service endpoint.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 also illustrates configured storage medium embodiments;

DETAILED DESCRIPTION

Overview

A variety of web application development options are available, including platforms such as the Microsoft® SharePoint® platform, the Google® Apps platform, the HyperOffice® platform, the Box.Net® platform, and others. (Marks of Microsoft Corporation, Google Inc., Application Corporation DBA HyperOffice, and Box.net, Inc., respectively).

For example, one familiar with the SharePoint® platform can develop, debug, and deploy SharePoint® web services. A SharePoint® developer may begin by creating multiple projects for the web services, web service proxies, and supporting components like database, admin UI (administrative user interface), and Windows PowerShell® commands (mark of Microsoft Corporation). Next, the developer creates manifest, feature, and element files for the various components, packaging them into one or more WSPs (SharePoint® Solution Package files). Then the developer creates scripts for installing the WSPs on a SharePoint® server, and installs and provisions the web service and web service proxies via the Windows PowerShell® commands or service admin page. Use of other web application platforms can involve similar steps. Well-crafted web applications meet user needs, but debugging and development of web services can be time consuming and error prone, especially when a large number of steps and components are involved.

Some embodiments described herein provide or cooperate with custom item templates and SharePoint® or other project item assemblies for developing, deployment and debugging of web services and their proxies. Development, debugging, and deployment of the web services and their proxies can be done in a single project while retaining flexibility in terms of how a solution is packaged and deployed to the server. Some embodiments help provide an incremental development scenario for the services and their proxies.

Some embodiments facilitate development, deploying, and debugging of web services and web service proxies, through functionality for automatic generation of service interfaces for use in a web service proxy project item, by a custom tool. Some provide or cooperate with project item templates and associated project item provider assemblies to develop the service and proxy in a project, such as a SharePoint® project or another platform project, for example. In some cases, the project item provider assemblies add support such as strong name replacement (e.g., for a .svc file), attaching to host processes, (e.g., Microsoft® Internet Information Server (IIS) worker processes which host a SharePoint® web service and proxy), and creating a custom feature, e.g., for a SharePoint® web service and proxy (marks of Microsoft Corporation).

Some embodiments described herein may be viewed in a broader context. For instance, concepts such as addresses, metadata, queries, responses, parameters, interfaces, and automation may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving addresses, metadata, queries, responses, parameters, interfaces, or automation are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"BASIC-family language" means BASIC, Visual Basic® language, RealBasic™ language (mark of Real Software, Inc.), and any programming language which has at least a subset that complies with any ANSI BASIC programming language standard for minimal or full BASIC.

"C-family language" means C, C++, C#, Objective-C, and any programming language which has at least a subset that complies with any ANSI C programming language standard.

"CLI-managed languages" means any language (other than assembly, byte code, machine code, and other low-level languages) supported by any Common Language Infrastructure implementation, including without limitation implementations such as Microsoft® .NET™ (marks of Microsoft Corporation), Mono® (mark of Novell, Inc.), and Portable.NET implementations.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "endpoint(s)" means "one or more endpoints" or equivalently "at least one endpoint".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, creating, editing, entering, exposing, extracting, generating, identifying, invoking, making, obtaining, receiving, sending, specifying, using, or viewing with regard to a destination or other subject may involve intervening action such as forwarding, copying, uploading, downloading, encoding, decoding, compressing, decompressing, encrypting, decrypting, authenticating, calling, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
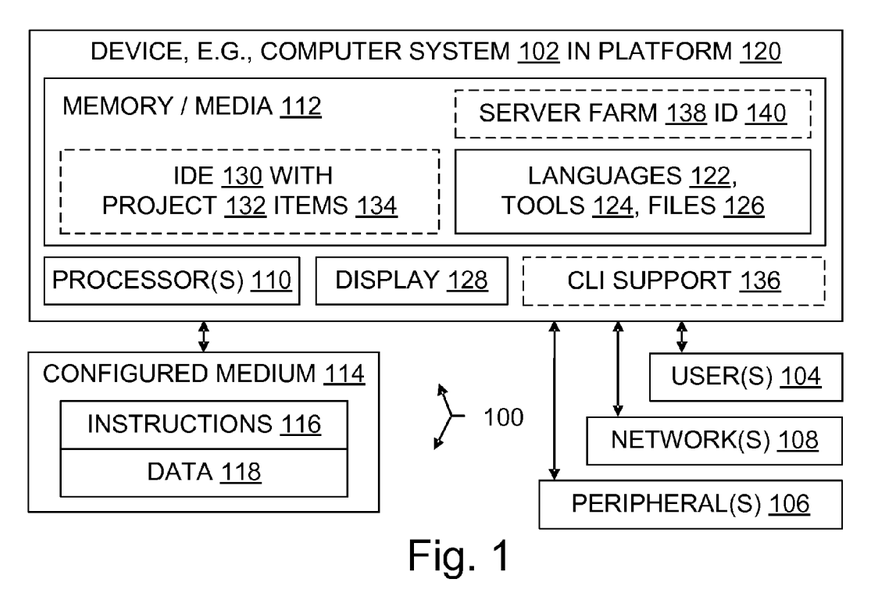
FIG. 1 is a block diagram illustrating a computer system in a web application development platform, the computer system having at least one processor, at least one memory, programming languages and other tools for developing web applications, and other items in an operating environment which encompasses multiple network nodes.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways. The computer system may be part of a platform 120, such as a web application platform.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data may also be transformed by augmentation as discussed herein.

Programming languages 122 in the form of compilers, interpreters, debuggers, profilers, and other tools 124, other software, as well as files 126 containing data, source code, and executable code, and other items shown in the Figures and/or discussed in the text may reside partially or entirely within one or more media 112, thereby configuring those media. An operating environment may also include display(s) 128, and other hardware such as buses, power supplies, and accelerators, for instance.

A given operating environment 100 may include an Integrated Development Environment (IDE) 130 which provides a developer with a set of coordinated software development tools for projects 132 containing files and other project items 134. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use web applications. Common Language Infrastructure (CLI) support 136 in the form of tools 124, documentation files 126, and configuration data may be present, as part of the IDE 130 or otherwise. Environments may support web applications in part by providing access to a server farm 138, which is identified by an ID 140 containing the farm's name, address, and/or other identifier(s).

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
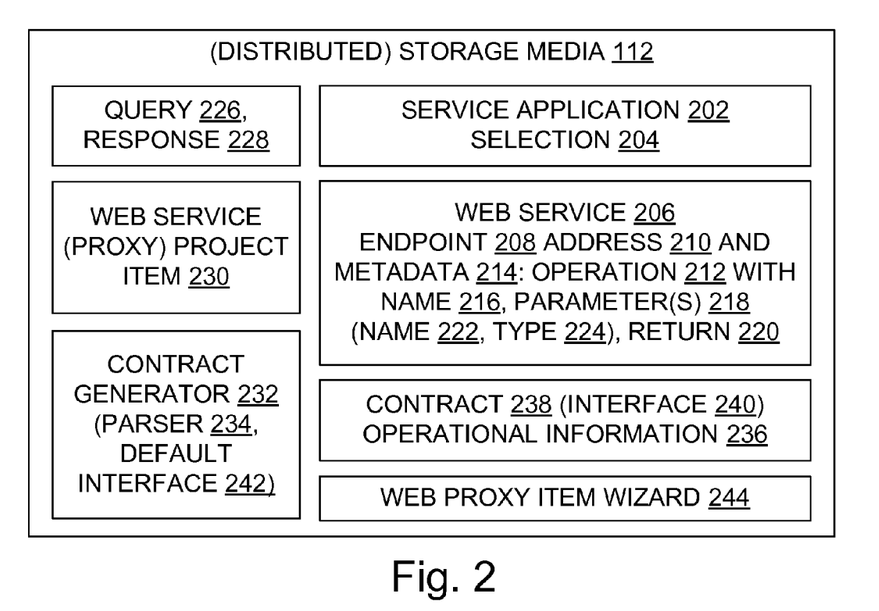
FIG. 2 is a block diagram illustrating aspects of web service proxy interface augmentation in an example architecture.

FIG. 2 illustrates an architecture which is suitable for use with some embodiments. A web service application 202 under development (e.g., as a project 132 of an IDE) is represented by name, address, index, and/or other data specifying the application 202 as a selection 204 from within a set of possible projects/applications. The web service application 202 is sometimes referred to herein as a "web application".

The web application 202 includes, invokes, and/or otherwise uses web service(s) 206 which are exposed (e.g., exported, offered, made public, or otherwise provided) at web service endpoint(s) 208. A web service endpoint can be identified by its address 210. The endpoint 208 exposes operation(s) 212. In some embodiments, information about the exposed operation(s) 212 is available automatically in the form of metadata 214. Metadata may include an operation's name 216, parameter(s) 218 if any, and result returned 220. Parameter 218 metadata may include a parameter name 222 and type 224, for example.

Some embodiments obtain metadata 214 by sending a suitable query 226; the metadata is then provided in a response 228. To create or enhance a web proxy project item 230, 134 the metadata is supplied in some embodiments to a contract generator 232. A parser 234 in the contract generator parses the response 228 and extracts operational information 236 such as which operations 212 are exposed, and their respective names, parameters, and returns. A contract 238 is then generated by the generator 232, based on extracted operational information 236. The contract 238 itself may be viewed as language-independent, or equivalently, as capable of being represented in one or more programming languages 122. An interface 240 is a particular instance of the contract 238 in a given language 122. If metadata is unavailable, a default interface 242 may be produced for developer use. Generation of interface(s) 240, queries 226, and/or other aspects of web proxy project item augmentation, may be assisted or performed entirely by a web proxy item wizard 244.

Figure 3:
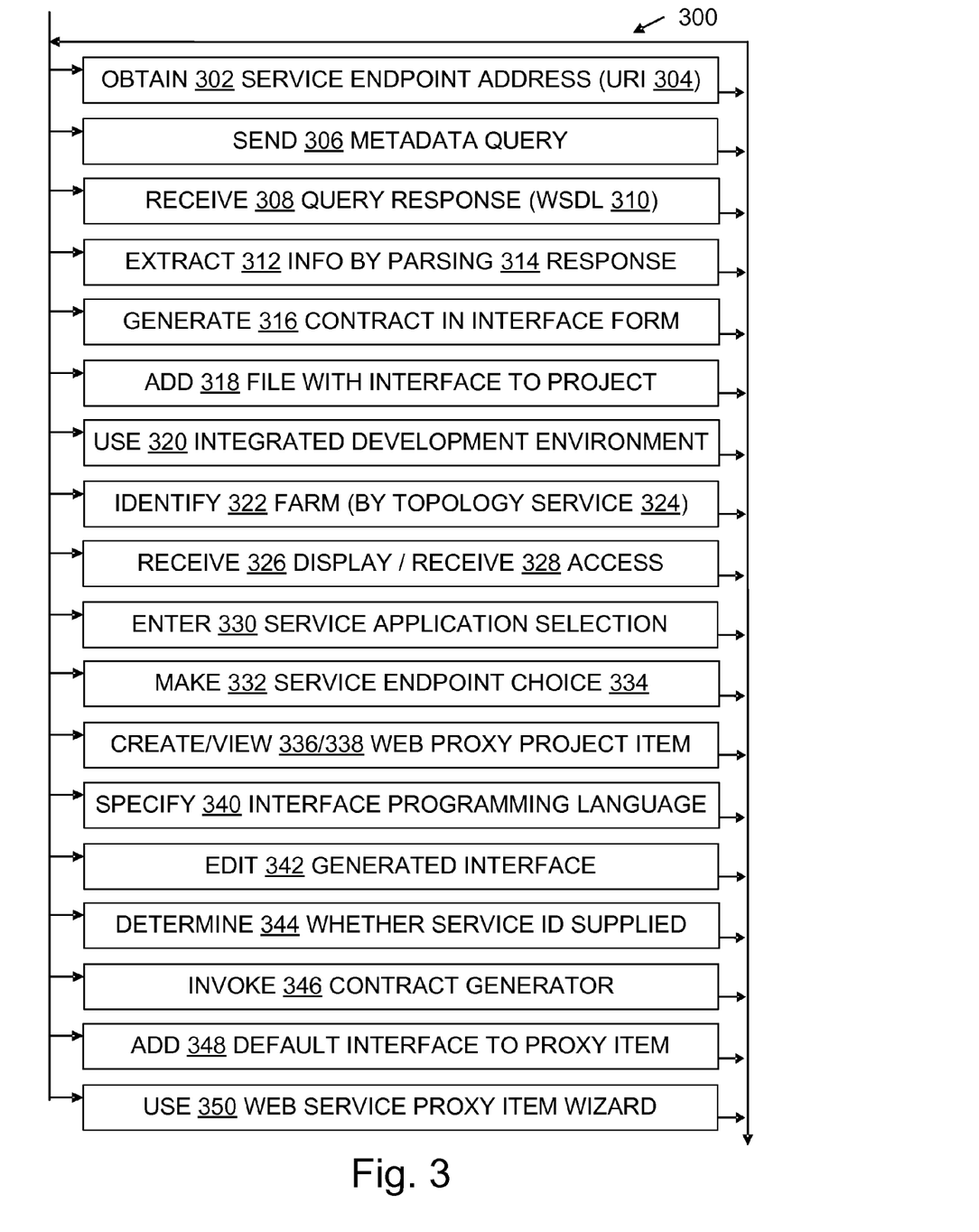
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software to transform a project 132 by extending functionality with generated contract(s) 238 and/or otherwise as described herein.

Some embodiments include a computer system 102 with a logical processor 110 and a memory 112 in operable communication with the logical processor. A web service contract generator 232 residing in (and hence configuring) the memory 112 has a web service description language parser 234 and a default interface 242. This default interface 242 is free of non-contract declarative programming constructs. For example, the default interface 242 does not contain Microsoft® Windows Communication Foundation (WCF) programming constructs that are directed to addressing or binding, as opposed to constructs directed to contract definition. Note that [ServiceContract] and [OperationContract] are WCF-specific and in some embodiments would be present in the interface, as SharePoint® web service applications are WCF-based. A server farm 138 development project 132 also resides in the memory 112; this project has a web service proxy item 230, 134. In some embodiments, the proxy project item has the default interface file that will be added if the developer or other user does not provide a topology service URL to the proxy project item wizard.

In some embodiments, the system 102 includes logic (software and/or hardware suitably tailored) for determining 344 whether a deployed web service identifier 140 has been supplied for the web service proxy item. The logic may be implemented in a wizard 244 and/or other software tool(s) 124, for example, with supporting hardware. In the event the deployed web service identifier has been supplied, the logic invokes 346 the web service contract generator; if the identifier has not been supplied, the logic adds 348 the default interface 242 to the web service proxy item 230.

In some embodiments, the system 102 includes logic for obtaining 302 an address 210 of a web service endpoint 208, sending 306 a metadata query 226 to the web service endpoint at the address, receiving 308 a response 228 to the metadata query, extracting 312 operational information 236 by parsing 314 the response with the web service description language (310) parser 234, and generating 316 a web service contract from the extracted operational information.

In some embodiments, the system includes a contract in the form of a textual interface 240 generated by the web service contract generator 232. In some, the textual interface generated by the web service contract generator is written in one of the following programming languages 122: a C-family language, a BASIC-family language. In some, the generated interface is written in a language managed within (having support 136 specific to) a Common Language Infrastructure implementation.

In some embodiments, the system includes an address 210 of a web service endpoint, a metadata query 226 to the web service endpoint, a response 228 to the metadata query, and a web service contract 238 (in interface form) consistent with the response. In some, the system includes a web service proxy project item wizard 244. In some, the system includes operational information 236 associated with the web service proxy item and including at least the following for an operation 212 exposed by a web service endpoint: an operation name 216, and an operation return 220 value.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, endpoints 208 may be on multiple devices/systems 102 in a networked cloud, project items 134 may be stored on yet other devices within the cloud, and the generated interface(s) 240 may configure display(s) on yet other cloud device(s)/system(s) 102.

Processes

FIG. 3 illustrates some process embodiments in a flowchart 300. Processes shown in the Figures may be performed in some embodiments automatically, e.g., by a wizard 244 driven under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a service endpoint obtaining step 302, an embodiment obtains an address 210 of a web service endpoint. Step 302 may be accomplished using manually entered data, or automatically through a shell command to get a list of published addresses, such as published IP addresses or other published uniform resource identifiers (URIs) 304, or with another mechanism, for example.

During a metadata query sending step 306, an embodiment sends a metadata query 226 to a web service endpoint 208 to get information about operation(s) 212 available at the endpoint. Step 306 may be accomplished using Simple Object Access Protocol (SOAP), HTTP, XML, and/or other familiar protocols, and using a metadata exchange when the endpoint URI is configured with one, or using another mechanism, for example.

During a query response receiving step 308, an embodiment receives a response 228 to a metadata query. Step 308 may be accomplished using Simple Object Access Protocol (SOAP), HTTP, XML, and/or other familiar protocols, for transmittal of responses 228 to metadata queries 226. In particular, some embodiments send 306 a query 226 requesting that (or assuming that) the response 228 will be returned in a web service description language 310 format.

During an information extracting step 312, an embodiment extracts operational information 236 from a query response 228, at least in part by parsing 314 the response. Steps 312 and 314 may be accomplished, for example, using familiar data extraction and parsing mechanisms, adapted to parse responses (e.g., WSDL 310 responses 228) and to extract operational information 236 (as opposed to focusing data extraction on timestamps, authentication, or other information that might be present in a given response).

During a contract generating step 316, an embodiment generates a contract 238, e.g., in the form of one or more language-specific interfaces 240. The interfaces 240 are textual, i.e., they are written in a text format such as a format used for source code, scripts, XML, or user documentation. Step 316 may be accomplished by embedding extracted operational information 236 in a textual framework tailored to a specified programming language, for example, by using general approaches such as those for source code generation and/or source-to-source translation, adapted for the particulars described herein. The generated 316 interface may be a syntactically complete unit, or a fragment of one. The interface 240 is saved in a file 126 or other storage, so it can be made part of a web application.

During a file adding step 318, an embodiment adds a file 126 (which is in RAM or in non-volatile memory) containing the generated interface (and possibly also other text) to a project 132, e.g., as part of a web proxy project item 230. Step 318 may be accomplished using familiar mechanisms for adding files to projects, for example.

During an IDE using step 320, a developer or other user 104 uses an IDE 130, e.g., by invoking or otherwise using 350 a web proxy item wizard 244 of an IDE, by viewing 338 or editing 342 a generated interface 240 in an IDE, or by providing 322, 330, 332, 336, 340 input through/to the IDE in connection with web proxy project item (e.g., interface 240) augmentation.

During a server farm identifying step 322, a user (or farm identifying logic acting on behalf of a user 104) identifies a server farm 138 to an IDE, a wizard, or other logic. Step 322 may be accomplished by identifying a topology service 324 of a server farm 138, by providing a server farm ID 140 directly, by a service discovery system, or by another mechanism, in a given embodiment. In some embodiments, topology service 324 is not necessarily on the same server farm as the service endpoint. For example, in some embodiments a service discovery capability uses peer-to-peer mechanisms and/or Domain Name System (DNS) mechanisms. In some embodiments, a familiar service discovery protocol is used to discover the topology service (and in particular, to discover a SharePoint® topology service).

During a display receiving step 326, a user (or display receiving logic acting on behalf of a user 104) receives a configured display 128, namely, a display configured with a list or other visualizable representation of service application(s) 202 of an identified 322 server farm 138, and/or a display configured with a list or other visualizable representation of web service endpoint(s) 208 of a selected 204 service application 202.

During an access receiving step 328, a user (or access receiving logic acting on behalf of a user 104) receives access to a generated 316 contract, e.g., by viewing an interface of the contract in an IDE, or by receiving control over a file which contains an interface of the contract (e.g., control over the file's name, location, content, and/or continued existence).

During a service application selection entering step 330, a user (or service application selection entering logic acting on behalf of a user 104) enters a service application selection 204, e.g., by using 320 an IDE's user interface.

During a service endpoint choice making step 332, a user (or service endpoint choice making logic acting on behalf of a user 104) makes a choice 334 of one or more service endpoints 208, e.g., by using 320 an IDE's user interface.

During a web proxy project item creating step 336, a user (or web proxy project item creating logic acting on behalf of a user 104) creates a web proxy project item 230, e.g., by creating a new project item 134 ready to be populated with operational information 236.

During a web proxy project item viewing step 338, a user (or web proxy project item viewing logic acting on behalf of a user 104) views (or configures a display for viewing) a web proxy project item 230, e.g., by using 320 an IDE's user interface.

During an interface language specifying step 340, a user (or interface language specifying logic acting on behalf of a user 104) specifies a programming language to be used in an interface 240 that will subsequently be generated 316. Step 340 may be accomplished, e.g., by using 320 an IDE's user interface to select from languages such as a C-family language, a BASIC-family language, and/or language(s) managed within a Common Language Infrastructure implementation. In some embodiments, the programming language used for the interface is determined by the language used for the project, which a user may specify in an "Add New Project" dialog box or the like.

During an interface editing step 342, a user (or interface editing logic acting on behalf of a user 104) edits a generated interface 240. Step 342 may be accomplished, e.g., by using 320 an IDE's text editor.

During a service ID status determining step 344, an embodiment determines whether a user or some other source (e.g., a built-in or configured default value) has supplied a web service ID, such as a web service address 210, that may lead to operational information 236 about exposed services 206. Step 344 may be accomplished with logic that tests the value of Boolean and/or web service ID variable(s), for example.

During a contract generator invoking step 346, an embodiment invokes a contract generator 232, e.g., through a suitably adapted calling mechanism, script, message, interrupt, and/or other familiar mechanism for passing control and conveying parameter information, namely, parameter values and/or their location(s).

During a default interface adding step 348, an embodiment adds a default interface 242 (possibly by adding 318 a file 126 containing the default interface) to a project 132 web proxy project item 230. Step 348 may be accomplished using familiar mechanisms for adding files to project items, for example, which are adapted to add the default interface to a proxy item 230. In some embodiments, the default interface is added if no service identifier (e.g., topology service URL) is provided to the project proxy item.

During a wizard using step 350, a user (or wizard using logic acting on behalf of a user 104) uses a web proxy item wizard 244, e.g., by invoking the wizard and/or by using operational information 236 obtained by the wizard 244.

The foregoing steps and their interrelationships are discussed in greater detail below, in connection with various embodiments.

Some embodiments provide a process for configuring a web service proxy in a messaging environment. The process includes automatically or manually obtaining 302 an address of a web service endpoint, automatically or manually sending 306 a metadata query to the web service endpoint at the address, automatically or manually receiving 308 a response to the metadata query, automatically or manually extracting 312 operational information, and automatically generating 316 a textual interface from the extracted operational information. In some embodiments, the textual interface is free of (does not contain) non-contract programming constructs.

Some embodiments automatically or manually obtain 302 a uniform resource identifier 304 as the address of the web service endpoint, and some obtain 302 an address 210 in a simple object access protocol messaging environment. Some receive 308 the response in a web service description language 310 format.

Some embodiments automatically extract 312 at least the following operational information 236 for an operation exposed by the web service endpoint: an operation name, a parameter name and a corresponding parameter type, and an operation return type.

Some embodiments automatically generate 316 a textual interface 240 in at least one of the following programming languages: a C-family language, a BASIC-family language, a language managed within a Common Language Infrastructure implementation. Some automatically add 318 a file containing the generated textual interface to a project in an integrated development environment 130.

Some embodiments provide a developer process for web service proxy interface augmentation. The "developer" may be a full-time developer, or some other user 104 who is acting at the time of the process' performance in the role of a developer. The developer performs steps in an integrated development environment (IDE), such as identifying 322 a server farm to the IDE, receiving 326 from the IDE a display of service application(s) of the server farm, entering 330 a service application selection in the IDE, receiving 326 from the IDE a display of web service endpoint(s) of the selected service application, making 332 a web service endpoint choice in the IDE, and receiving 328 access through the IDE to an automatically generated textual interface 240. The interface 240 contains operational information for an operation exposed by the web service endpoint. In some embodiments, the interface 240 is "non-reliant" on non-contract declarative programming constructs. That is, the interface 240 either does not contain non-contract constructs, or if it contains them it would operate the same way in the web application if they were removed from the interface.

In some embodiments, identifying 322 a server farm to the IDE is done, at least in part, by identifying to the IDE a topology service 324 of the server farm.

In some embodiments, the developer also creates 336 a web proxy project item in the IDE. In some, receiving 326 from the IDE a display of web service endpoint(s) of the selected service application includes viewing 338 the display web service endpoint(s) as part of viewing 338 the web proxy project item.

In some embodiments, the developer specifies 340 a programming language for the automatically generated textual interface. In others, only one language is available. In some embodiments, the contract is always generated in multiple languages. In some, the developer edits 342 the automatically generated interface.

Configured Media

Some embodiments include a configured computer-readable storage medium 112. Medium 112 may include disks (magnetic, optical, or otherwise), RAM, EEPROMS or other ROMs, and/or other computer-readable storage media. The storage medium which is configured may be in particular a removable storage medium 114 such as a CD, DVD, or flash memory. A general-purpose memory, which may be removable or not, and may be volatile or not, can be configured into an embodiment using items such as a contract generator 232, automatically generated interfaces 240, and/or a web proxy item wizard 244, in the form of data 118 and instructions 116, read from a removable medium 114 and/or another source such as a network connection, to form a configured medium. The configured medium 112 is capable of causing a computer system to perform process steps for transforming data through interface augmentation as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from internal design documentation for SharePoint® software and/or Visual Studio® software (marks of Microsoft Corporation). SharePoint® technology and Visual Studio® technology includes programs, tools, templates, and other items implemented by Microsoft Corporation. Aspects of the design documentation and SharePoint®/Visual Studio® extensions are consistent with or otherwise illustrate aspects of the embodiments described herein. However, it will be understood that design documentation and/or implementation choices do not necessarily constrain the scope of such embodiments, and likewise that they may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

A SharePoint® farm project 132 is deployed at farm scope. As a result, a SharePoint feature (such as a web part) developed in a project of this type can be used on any machine that is part of the server farm 138 and on any site/web application that is part of the farm. The scope of the feature is the broadest possible among all possible SharePoint® scopes (farm, site, web application, web in decreasing order of scope).

When a SharePoint® web service proxy project item 230 is added to the project 132, files are arranged in a SharePoint-specific structure that is added to the project. For example, a view 338 may show content such as the following, in which an interface file 240 (IWebService1Contract.cs) has been generated 316 by an interface generation tool, a.k.a., a contract generator 232, and that file has been added to the web service proxy project item:

Solution 'SharePointProject1' (4 projects)+
+ BackEndProject
+ ProxyProject
− SharePointProject1

---

+ Properties
+ References
+ Features
+ Package
− WebService1
   − Proxy
      − Administration
         WebService1ApplicationProxy.cs
         WebService1Proxy.cs
      − Client
         − TestApplication.aspx
            TestApplication.aspx.cs
      − PowerShell
         WebService1ClientCmdlets.cs
      WebService1Client.cs
  + Service
    client.config
    Elements.xml
    IWebService1Contract.cs
    WebService1FeatureEvents.cs
  key.snk

---

Some embodiments go through steps such as the following in connection with generating 316 interfaces 240 for the proxy. A developer enters 322 the URL of the topology service 324 of the farm 138 in the project item wizard 244. A farm topology service describes how the SharePoint® service applications 202 are structured in a farm. The wizard contacts the topology service through a Windows PowerShell® command to get the list of service applications published by the farm (mark of Microsoft Corporation). The listen URI's (Uniform Resource Identifier) 304 are obtained 302 from the service applications and are displayed 326 in the proxy project item. When the developer clicks on one of the URI's the list of operations 212 associated with that URI are displayed 326 in the proxy wizard. The developer then clicks on a button in the wizard to generate 316 the interface for a specific listen URI.

At this point the interface generation tool 232 takes over, using the data passed from the wizard (specifically, the service application and listen URI). The following steps happen in the tool. The listen URI would be used to query 306 for WSDL (web service description language) for the URI, that is, for a data exchange format that is used to pass metadata 214 about the service. In this implementation, WSDL for the URI is available only if the URI endpoint has been configured to expose metadata, which can be done by adding a metadata exchange endpoint for the URI. The WSDL is parsed 314 to extract the following information 236 for the operations exposed by the URI: Operation name, Return type, Parameters names and their types.

The data 236 extracted from the WSDL is used in this implementation to generate 316 a C# or Visual Basic® .NET interface (mark of Microsoft Corporation), along the lines of the following IWebService1Contract.cs content:

```
namespace SharePointProject1
{
    using System;
    using System.ServiceModel;
    using System.ServiceModel.Web;
    [ServiceContract]
    internal interface IWebService1Contract
    {
        [OperationContract]
        int Add(int a, int b);
    }
}
```

A C# or VB.NET file is created, and the interface 240 is added to that file. Then the file is added 348 to the proxy project item in the SharePoint® project.

Thus, in this implementation the wizard 244 will do some preliminary work before the interface generation tool 232 generates the interface 240. In this implementation, if external load balancing is configured for the farm which is being queried for service applications (to generate the interfaces) there may be only one listen URI which references the load balancer rather than the actual servers hosting the endpoints. In that case, custom interfaces 240 will not be generated. Also, if no URL is provided, the interface above will be used, as a default interface 242. This default interface file is part of the proxy project item and is added to the project item only if a custom interface file was not generated using operational information 236. If a default interface 242, 240 is added then the developer is responsible for making appropriate modifications to the interface based on the developer's knowledge of the web service's available public functions.

By way of context, a familiar WSDL.exe utility is used with ASMX web services (also known as ASP.NET web services) and is able to parse WSDL version 1.1. ASMX web services were apparently developed before the Windows Communication Foundation (WCF) way of developing web services was created. Most WCF web services today use WSDL version 2.0, which is substantially different from version 1.1. Internally, SharePoint® web service applications use WCF, and abstract away many complications of using WCF with SharePoint® technology. SvcUtil.exe is another tool that is able to parse WSDL 2.0 obtained from WCF services, however the proxies generated with SvcUtil.exe are not suitable to use with SharePoint® web service applications until non-contract constructs such as WCF-specific programming constructs are removed from the proxies. One implementation could use a simpler interface generated from WSDL 2.0 for the SharePoint® web application, namely, a hypothetical version of WSDL.exe that works with WSDL 2.0. However, this is hypothetical because it appears that wsdl.exe was never upgraded after WCF (and SvcUtil.exe) came to the fore.

Some embodiments operate in an environment of Visual Studio® SharePoint® tooling extensions for SharePoint® web service application development. This environment includes a SharePoint service eco-system having a web part/web control and service application proxy on a web front end that communicates with a web browser, as well as service—WCF interfaces and service—business logic on app server(s), optional service components, and optional database elements. In this context, extensions may be described and used as follows, for example.

As to components, these may include SharePoint® project item templates to develop SharePoint® web service and SharePoint® web service proxy, e.g., Web service (SharePoint14WebService.zip), Web service proxy (SharePoint14WebServiceProxy.zip). Components may also include SharePoint® project item providers to support deployment and debugging of the SharePoint® web service item templates, e.g., project item provider assemblies SPWebServiceProvider.dll, SPWebServiceProxyProvider.dll. Components may also include SharePoint® commands used by the project item provider assemblies. These commands provide operations to support deploying SharePoint® web service and SharePoint® web service proxies. The SharePoint® command assembly is SharePointCommands.dll.

Components may also include a custom tool 232 to generate contracts (as C#/VB interfaces 240) for SharePoint® web services deployed to a server. One prototype of the tool is called WSAContractGenerator.exe. Components may also include an assembly for the SharePoint® web service proxy project item wizard, e.g., SPWebServiceProxyWizard.dll. Components may also include familiar DTE (Microsoft® EnvDTE) debugging support, and/or a Visual Studio® macro file that allows the SharePoint® project to attach the Visual Studio® debugger to the Internet Information Services (IIS) worker process that hosts the SharePoint® web services. Local and/or remote debugging of the web services may be supported for a given embodiment. Components may also include an MSI that invokes a VSIX file called SPWebServiceVSIX, used to install all of the foregoing components except the macro file. The macro file is installed as a custom action of the MSI.

With regard to workflows, and specifically with regard to developing, debugging, and deploying a SharePoint® Web Service, the following may be noted. When the extensions are installed, 'Web Service' and 'Web Service Proxy' will be visible as a project item under a 'SharePoint->2010' node in the 'Add New Item' dialog box. A SharePoint® web service and/or proxy can be added to a SharePoint® project by selecting these items in the 'Add New Item' dialog box.

The following steps describe creation, debugging, and deployment of a SharePoint® web service and web service proxy using the SharePoint web service extensions: Create a new solution. Add a new C#/VB farm SharePoint project through the 'Add New Project' dialog (Visual C#->SharePoint->2010). Add a 'SharePoint Web Service' project item to the project. By default a sample SharePoint® web service, Windows PowerShell® command, and admin UI pages are added through the project item. A single feature is created for the SharePoint® web service.

When the SharePoint® web service project item is added to a project the following actions happen to support deployment and debugging: Support is added for attaching to the w3wp.exe worker process that will host the web service so that setting a breakpoint in the web service code works. Both local and remote debugging may be supported. Support is added for strong name assembly replacement in the SharePoint® web service .svc file. Operations are added to a service contract in 'IWebService1Contract.cs' and implemented in 'WebService1Contract.cs'.

On deployment in this envisioned approach, the following actions will happen in the 'FeatureActivated' feature event receiver: SPService will be installed and provisioned. SPServiceInstance will be installed and provisioned. SPServiceApplication will not be installed at all. During deployment the components of the service are deployed to the following locations in the 14 hive: Service (.svc to \Program Files\Common Files\microsoft shared\web server extensions\14\WebServices\<Project Item Name>, web.config to %CommonProgramFiles%\microsoft shared\web server extensions\14\WebServices\<Project Item Name>), PowerShell (Program Files\Common Files\Microsoft Shared\Web Server Extensions\14\CONFIG\POWERSHELL\Registration), Admin UI Page (\Program Files\Common Files\Microsoft Shared\Web Server Extensions\14\TEMPLATE\ADMIN\<Project Item Name>). Project assembly will be deployed to the GAC. Hitting F5 will attach the debugger to the w3wp.exe process on the local or remote SharePoint® server that will host the web service. During deployment, Windows PowerShell® scripts for invoking the web service and commands are optionally auto-generated. These scripts can then be invoked in post-deployment command in SharePoint® project properties to control installing, provisioning, and invoking the service.

With specific regard to developing, debugging, and deploying a SharePoint® Web Service Proxy in this context, the following may be noted. Add a new empty C#/VB farm SharePoint project through the 'Add New Project' dialog (Visual C#->SharePoint->2010). Add a 'Web Service Application Proxy' project item to the project. A single feature is created for the SharePoint® web service proxy. The SharePoint® web service proxy project item wizard 244 allows the developer to generate 316 a contract to target a specific service deployed on a server. The contract generation is done in this envisioned approach by a custom tool 232 (WSAContractGenerator.exe) that is installed when the web service proxy project item is added to the project. This tool WSAContractGenerator.exe accepts a SharePoint® service URL and sends 306 a query for WSDL for that service. It parses 341 WSDL to generate C# or VB interface classes that correspond to the contracts for the service. This version of the tool 232 is able to generate service contracts only for services that are already deployed to the server and are running. If no URL is provided to the tool then the proxy item wizard 244 will generate default interface 242 classes that the developer will modify to match the contract for the service for which the developer is creating a proxy.

For example, for a calculator service the WSAContractGenerator.exe tool will generate an interface from the WSDL for the service like this:
using System;
using System.ServiceModel;

```
namespace Sample.Calculator.Client
{
    [ServiceContract]
    public interface ICalculatorServiceContract
    {
        [OperationContract]
        int Add(int a, int b);
    }
}
```

A class diagram of the WSAContractGenerator.exe tool is shown below; it will be understood that this class diagram, like other implementation details discussed herein, may differ between embodiments:

| WSAInterfaceGenerator |
|---|
| − wsdl: string |
| + GetWSDL(string url) : string |
| + GenerateInterfaces( ) : void |
| # CreateParseTree( ) : XElement |

In some approaches, workflow involves a Visual Studio® portion and a SharePoint® portion. It will be appreciated that this provides insight into other approaches in which workflow involves an IDE 130 portion and a platform 120 portion.

Deployed Service. Within the Visual Studio® portion of workflow for developing and deploying a SharePoint® web proxy for deployed services, one creates a new SharePoint® farm project, and adds a SharePoint® web service proxy project item to the project. In the project item wizard, one specifies the site that will host the service proxy and the URL (uniform resource locator), if any, of the deployed SharePoint® web service for which the proxy is being created. If a URL is provided, one invokes a custom tool 232 to generate the interfaces 240 for the proxy. One modifies the default web service proxy provided by the item template, packages the proxy, and deploys the proxy. In some embodiments, the developer would supply the server farm topology URL to the proxy project item wizard; if none is supplied, then a default interface is added through the proxy project item.

Deploying Service. Within the Visual Studio® portion of workflow for developing and deploying a SharePoint® web service and proxy, one creates a new SharePoint® farm project, and adds a SharePoint® web service project item to the project. One modifies the default web service provided by the item, modifies the default web service proxy provided by the item template, packages the proxy, and deploys the proxy.

Within either workflow (deployed service or deploying service), if debugging is enabled, one attaches a Visual Studio® debugger to w3wp.exe process on the SharePoint® server that hosts the SharePoint® web service. One installs and provisions the SharePoint® service and proxy on the SharePoint® server. Within the SharePoint® portion, and specifically within a datastore, this example includes a SharePoint® Config Database, IIS Metabase (Site hosting web service and proxy), Hive (\Program Files\Common Files\Microsoft Shared\Web Server Extensions\14), and Global Assembly Cache (GAC).

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for configuring a web service proxy for a service in a messaging environment when operational information about the service is not available through a metadata query, the process comprising the steps of:
    automatically obtaining an address of an exposed web service endpoint;
    automatically sending a metadata query to the web service endpoint at the address querying the exposed web service endpoint for a web service description language file (WSDL) of the service;
    receiving a response to the metadata query;
    automatically determining from the response that operational information about the service is not available because no WSDL for the service was supplied in response to the metadata query; and
    automatically generating a default textual interface which is not specific to the service, the default textual interface containing at least one default contract programming construct which does not match any contract for the service, the textual interface free of programming constructs that are directed to addressing or binding.

2. The configured medium of claim 1, wherein the messaging environment comprises a simple object access protocol messaging environment.

3. The configured medium of claim 1, wherein the default textual interface is free of Windows Communication Foundation (WCF) programming constructs that are directed to addressing or binding but includes at least one of the following: a WCF service contract programming construct, a WCF operation contract programming construct.

4. The configured medium of claim 1, wherein the default textual interface is free of the following operational information for an operation exposed by the web service endpoint:
    an operation name,
    a parameter name and a corresponding parameter type, and
    an operation return type.

5. The configured medium of claim 1, wherein the process automatically generates the default textual interface in at least one of the following programming languages: a C-family language, a BASIC-family language, a language managed within a Common Language Infrastructure implementation.

6. The configured medium of claim 1, further comprising automatically adding a file containing the generated default textual interface to a project in an integrated development environment.

7. A process for configuring a web service proxy for a service when operational information about the service is not available through a metadata query, the process comprising the following steps performed by a developer in an integrated development environment (IDE):
    identifying a server farm to the IDE;
    receiving from the IDE an indication that operational information about the service is not available because no web service description language (WSDL) for the service was supplied by the server farm;
    receiving from the IDE a display of a default textual interface which is not specific to the service, the default textual interface containing at least one default contract programming construct which does not match any contract for the service, the textual interface free of programming constructs that are directed to addressing or binding; and
    through the IDE modifying the default textual interface by adding operational information about the service.

8. The process of claim 7, wherein identifying a server farm to the IDE comprises identifying to the IDE a topology service of the server farm.

9. The process of claim 7, further comprising the developer creating a web proxy project item in the IDE.

10. The process of claim 7, further comprising the developer specifying a programming language for the default textual interface.

11. The process of claim 7, further comprising the developer editing the default textual interface to match a contract for the service for which the developer is creating a proxy.

12. A computer system comprising:
    a logical processor;
    a memory in operable communication with the logical processor;
    a web service contract generator residing in the memory and having a web service description language (WSDL) parser and a default interface, the default interface free of reliance on non-contract declarative programming constructs, namely, binding declarations and addressing declarations, the default interface not specific to the service, the default interface containing at least one default contract programming construct which does not match any contract for a service S;
    a server farm development project residing in the memory and having a web service proxy item for the service S when operational information about the service S is not available through a metadata query because no WSDL for the service S is being supplied; and code which upon execution by the processor determined that no deployed web service identifier has been supplied for the web service proxy item and then added the default interface to the web service proxy item.

13. The system of claim 12, wherein the system comprises a contract in the form of a textual interface generated by the web service contract generator.

14. The system of claim 13, wherein the textual interface generated by the web service contract generator is written in one of the following programming languages: a C-family language, a BASIC-family language.

15. The system of claim 13, wherein the textual interface generated by the web service contract generator is written in a language managed within a Common Language Infrastructure implementation.

16. The system of claim 12, wherein the system comprises logic for performing the following:
   obtaining an address of a web service endpoint;
   sending a metadata query to the web service endpoint at the address;
   receiving a response to the metadata query;
   extracting operational information by parsing the response with the web service description language parser; and
   generating a web service contract from the extracted operational information.

17. The system of claim 12, wherein the system further comprises the following:
   an address of a web service endpoint;
   a metadata query to the web service endpoint;
   a response to the metadata query; and
   a web service contract consistent with the response.

18. The system of claim 12, wherein the system comprises a web service proxy project item wizard.

19. The system of claim 12, wherein the system further comprises operational information associated with the web service proxy item and including at least the following for an operation exposed by a web service endpoint:
   an operation name, and
   an operation return type.

20. The system of claim 13, wherein the system further comprises editor software for editing the default interface.

* * * * *